US012579888B2

(12) United States Patent (10) Patent No.: US 12,579,888 B2

Zhang (45) Date of Patent: Mar. 17, 2026

---

(54) DEADLOCK PRECAUTION AND PREVENTION FOR AUTONOMOUS VEHICLES

(71) Applicant: GM Global Technology Operations LLC, Detroit, MI (US)

(72) Inventor: Yuan Zhang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 18/315,078

(22) Filed: May 10, 2023

(65) Prior Publication Data

US 2024/0371266 A1 Nov. 7, 2024

(30) Foreign Application Priority Data

May 6, 2023 (CN) .......................... 202310508388.5

(51) Int. Cl.
G08G 1/00 (2006.01)
B60W 30/18 (2012.01)
(Continued)

(52) U.S. Cl.
CPC . G08G 1/096725 (2013.01); B60W 30/18154 (2013.01); B60W 40/04 (2013.01); B60W 60/00274 (2020.02); G08G 1/0112 (2013.01); G08G 1/0133 (2013.01); G08G 1/0141 (2013.01); G08G 1/0145 (2013.01);
(Continued)

(58) Field of Classification Search
CPC ........... G08G 1/096725; G08G 1/0112; G08G 1/0133; G08G 1/0141; G08G 1/0145; G08G 1/096791; B60W 60/00274; B60W 30/18154; B60W 40/04; B60W 2555/60;
(Continued)

(56) References Cited

U.S. PATENT DOCUMENTS

| | | | |
|---|---|---|---|
| 2021/0312796 A1* | 10/2021 | Lull ...................... | B60W 30/08 |
| 2024/0212486 A1* | 6/2024 | Beaurepaire ......... | G08G 1/0108 |
| 2024/0221502 A1* | 7/2024 | Avedisov .......... | B60W 30/0956 |

FOREIGN PATENT DOCUMENTS

| | | |
|---|---|---|
| DE | 102015219470 A1 | 4/2016 |
| DE | 102020126217 A1 | 4/2021 |
| | (Continued) | |

*Primary Examiner* — Tiffany P Young

(74) *Attorney, Agent, or Firm* — Vivacqua Crane, PLLC

(57) ABSTRACT

A system for deadlock precaution and prevention in autonomous vehicles (AVs) includes: AVs having actuators and sensors. The actuators alter a dynamic state of the AVs, and the sensors capture vehicle state and environmental information. The system receives vehicle state information and predicts a host AV trajectory, and trajectories of other vehicles approaching, entering, or within an intersection. Multi-directional conflicts identification per driving direction (MDCIPD) messages and vehicle state information are transmitted to a cloud computing device. Waiting relations for deadlock prevention are based on the MDCIPD messages and vehicle state information, and a deadlock precaution notification (DPN) and/or a deadlock prevention coordination instruction (DPCI) are generated. The AVs perform advanced driver assistance system (ADAS) functions via the actuators in response to the DPN and/or DPCI, and cause the AVs to avoid deadlock at the intersection.

20 Claims, 3 Drawing Sheets

(51) Int. Cl.

| | | |
|---|---|---|
| *B60W 40/04* | (2006.01) | |
| *B60W 60/00* | (2020.01) | |
| *G08G 1/01* | (2006.01) | |
| *G08G 1/0967* | (2006.01) | |

(52) U.S. Cl.
CPC ................. *G08G 1/096791* (2013.01); *B60W 2554/4045* (2020.02); *B60W 2554/406* (2020.02); *B60W 2555/60* (2020.02); *B60W 2556/65* (2020.02)

(58) Field of Classification Search
CPC ....... B60W 2556/65; B60W 2554/406; B60W 2554/4045
USPC ........................................................ 701/117
See application file for complete search history.

(56) References Cited

FOREIGN PATENT DOCUMENTS

| | | | | |
|---|---|---|---|---|
| DE | 112020001642 | | 3/2022 | |
| DE | 102021114596 | A1 | 6/2022 | |
| DE | 112020005275 | | 9/2022 | |
| FI | 130975 | B1 * | 6/2024 | ............. G08G 1/166 |

* cited by examiner

DEADLOCK PRECAUTION AND PREVENTION FOR AUTONOMOUS VEHICLES

INTRODUCTION

The present disclosure relates to vehicle control systems and more specifically to automated driver assistance systems (ADAS) that automatically control vehicle driving. Increasingly, vehicles are being equipped with ADAS systems that control a wide variety of vehicle dynamic functions. Some vehicles are available with varying degrees of "hands-off" functionality in which the vehicle can operate without human input for varying periods of time, or until the occurrence of a particular condition or set of conditions. Vehicles equipped with ADAS functionality require input from a variety of different sensors and many also communicate with other vehicles through vehicle-to-vehicle (V2V) communication systems, or with infrastructure through vehicle-to-infrastructure (V2I) communication systems.

ADAS-equipped vehicles can address a wide range of driving situations. However, as the quantity of ADAS-equipped and operated vehicles continues to grow, new situations may arise in which multiple ADAS-equipped vehicles encounter one another while driving in situations that may cause deadlock where the ADAS-equipped and driven vehicles are effectively unable to move. Accordingly, while current systems and methods for controlling vehicle functions through ADAS operate for their intended purpose, there is a need in the art for new and improved ADAS systems and methods that operate to allow ADAS-equipped and driven vehicles to prevent deadlock and gridlock situations without increasing complexity and without requiring standardization, while improving ADAS functionality, redundancy, and speed while maintaining or improving vehicle operator comfort.

SUMMARY

According to several aspects of the present disclosure, a system for deadlock precaution and prevention in autonomous vehicles includes: one or more autonomous vehicles (AVs). The system further includes one or more actuators and one or more sensors. The one or more actuators selectively alter a dynamic state of the one or more AVs. The one or more sensors are disposed on at least one of the one or more AVs and capture vehicle state information and information about an environment surrounding the one or more AVs. The system further includes one or more control modules. At least one of the one or more AVs that has the one or more sensors is also equipped with at least one of the one or more control modules. Each of the one or more control modules has a memory, a processor, and one or more input/output (I/O) ports. The memory stores programmatic control logic. The processor executes the programmatic control logic, and the I/O ports communicate with the one or more sensors and the one or more actuators. The programmatic control logic includes: at least first, second, third, fourth, fifth, and sixth control logics. The first control logic receives vehicle state information. The second control logic predicts a trajectory of a host AV approaching an intersection on a road, and predicts a trajectory of one or more other vehicles approaching, at, or within the intersection. The third control logic transmits multi-directional conflicts identification per driving direction (MDCIPD) messages and the vehicle state information to a cloud computing device. The fourth control logic determines waiting relations for deadlock prevention at the intersection based on the MDCIPD messages and vehicle state information. The fifth control logic transmits, from the cloud computing device, and receives, by the host AV the one or more AVs, one or more of a deadlock precaution notification (DPN) and a deadlock prevention coordination instruction (DPCI). The sixth control logic performs one or more advanced driver assistance system (ADAS) functions via the one or more actuators in response to receiving one or more of the DPN and DPCI, and causes the one or more AVs to avoid deadlock at the intersection.

In another aspect of the present disclosure the first control logic further includes control logic that receives a basic safety message (BSM) from the one or more other vehicles. The BSM includes vehicle size, vehicle type, vehicle speed, vehicle acceleration, vehicle location, vehicle heading, and vehicle turn signal status.

In yet another aspect of the present disclosure the second control logic further includes control logic for acquiring trajectory-related data for each of the one or more other vehicles and the host AV approaching the intersection by combining the vehicle state information and information about an environment surrounding the host AV, and BSMs from the one or more other vehicles. The second control logic further includes control logic that extrapolates a trajectory of each of the one or more vehicles, and of the host AV from the trajectory-related data.

In still another aspect of the present disclosure the third control logic further includes control logic that determines the MDCIPD messages, including predicting one or more conflicts between the host AV and the other vehicles, given a current driving direction and vehicle state information for the host AV, and for each of the other vehicles.

In yet another aspect of the present disclosure the fourth control logic further includes control logic that determines waiting relations to avoid deadlock based on driving directions, position and timing for each of the host AV and the other vehicles approaching, entering, or within the intersection, as well as topology, laws, signage, and rules of the intersection.

In still another aspect of the present disclosure the waiting relations define a right-of-way calculation for each of the host AV and the other vehicles. The right-of-way calculation utilizes driving directions, positions, and timing of each of the host AV and the other vehicles approaching, entering, or within the intersection, the topology and rules of the intersection, local laws, and signage present at or proximate to the intersection.

In yet another aspect of the present disclosure the fifth control logic further includes control logic that generates the DPN from the MDCIPD messages. The fifth control logic also includes control logic for generating the DPCI. The DPN includes information directly indicative of whether there is a potential for deadlock. The DPCI includes information directly indicative of control actions necessary for each of the host AV and any other AVs approaching, within, or entering the intersection to avoid deadlock at the intersection.

In still another aspect of the present disclosure the control logic for generating the DPCI further includes control logic that selectively generates the DPCI upon determining that two or more AVs capable of sending the MDCIPD messages are at, within, or entering the intersection.

In yet another aspect of the present disclosure the control logic that selectively generates the DPCI further includes control logic that, upon determining that there is no potential for deadlock at the intersection, causes the host AV to rely solely upon guidance systems and ADAS functions of the host AV to traverse the intersection. The control logic that selectively generates the DPCI also includes control logic that, upon determining that there is a potential for deadlock at the intersection based on a presence of at least one other vehicle at the intersection, causes the host AV to rely solely upon the host AV's guidance systems and ADAS functions to avoid deadlock at the intersection. The control logic that selectively generates the DPCI also includes control logic that, upon determining that there is a potential for deadlock at the intersection based on a presence of at least one other AV at the intersection, causes the host AV and the at least one other AV to coordinate guidance systems and ADAS functions to collectively avoid and prevent deadlock at the intersection.

In another aspect of the present disclosure a method for deadlock precaution and prevention in autonomous vehicles includes utilizing one or more autonomous vehicles (AVs) and selectively altering a dynamic state of the one or more AVs with one or more actuators. The method further includes capturing vehicle state information and information about an environment surrounding the one or more AVs with one or more sensors, the one or more sensors disposed on at least one of the one or more AVs. The method further includes executing programmatic control logic stored in memory of one or more control modules, at least one of the one or more AVs having the one or more sensors also being equipped with at least one of the one or more control modules, each of the one or more control modules also having a processor, and one or more input/output (I/O) ports, the processor executing the programmatic control logic, and the I/O ports in communication with the one or more sensors and the one or more actuators. The programmatic control logic receives vehicle state information from the one or more sensors. The programmatic control logic predicts a trajectory of a host AV approaching an intersection on a road, and predicts a trajectory of one or more other vehicles approaching, at, or within the intersection. The programmatic control logic transmits multi-directional conflicts identification per driving direction (MDCIPD) messages, and the vehicle state information to a cloud computing device. The programmatic control logic determines waiting relations for deadlock prevention at the intersection based on the MDCIPD messages and vehicle state information. The programmatic control logic transmits, from the cloud computing device, and receives, by the host AV the one or more AVs, one or more of a deadlock precaution notification (DPN) and a deadlock prevention coordination instruction (DPCI). The programmatic control logic performs one or more advanced driver assistance system (ADAS) functions via the one or more actuators in response to receiving one or more of the DPN and DPCI, and causes the one or more AVs to avoid deadlock at the intersection.

In still another aspect of the present disclosure the method further includes receiving a basic safety message (BSM) from the one or more other vehicles. The BSM includes vehicle size, vehicle type, vehicle speed, vehicle acceleration, vehicle location, vehicle heading, and vehicle turn signal status.

In still another aspect of the present disclosure the method further includes acquiring trajectory-related data for each of the one or more other vehicles and the host AV approaching the intersection by combining the vehicle state information and information about an environment surrounding the host AV, and BSMs from the one or more other vehicles. The method further includes extrapolating a trajectory of each of the one or more vehicles, and of the host AV from the trajectory-related data.

In still another aspect of the present disclosure the method further includes determining the MDCIPD messages, including predicting one or more conflicts between the host AV and the other vehicles, given a current driving direction and vehicle state information for the host AV, and for each of the other vehicles.

In still another aspect of the present disclosure the method further includes determining waiting relations to avoid deadlock based on driving directions, position and timing for each of the host AV and the other vehicles approaching, entering, or within the intersection, as well as topology, laws, signage, and rules of the intersection.

In still another aspect of the present disclosure determining waiting relations further includes defining a right-of-way calculation for each of the host AV and the other vehicles. The right-of-way calculation utilizes driving directions, positions, and timing of each of the host AV and the other vehicles approaching, entering, or within the intersection, the topology and rules of the intersection, local laws, and signage present at or proximate to the intersection.

In still another aspect of the present disclosure the method further includes generating the DPN from the MDCIPD messages, and generating the DPCI. The DPN includes information directly indicative of whether there is a potential for deadlock. The DPCI includes information directly indicative of control actions necessary for each of the host AV and any other AVs approaching, within, or entering the intersection to avoid deadlock at the intersection.

In still another aspect of the present disclosure generating the DPCI further includes selectively generating the DPCI upon determining that two or more AVs capable of sending the MDCIPD messages are at, within, or entering the intersection.

In still another aspect of the present disclosure selectively generating the DPCI further includes: upon determining that there is no potential for deadlock at the intersection, causing the host AV to rely solely upon guidance systems and ADAS functions of the host AV to traverse the intersection. Upon determining that there is a potential for deadlock at the intersection based on a presence of at least one other vehicle at the intersection, the method causes the host AV to rely solely upon the host AV's guidance systems and ADAS functions to avoid deadlock at the intersection. Upon determining that there is a potential for deadlock at the intersection based on a presence of at least one other AV at the intersection, the method causes the host AV and the at least one other AV to coordinate guidance systems and ADAS functions to collectively avoid and prevent deadlock at the intersection.

In still another aspect of the present disclosure a method for deadlock precaution and prevention in autonomous vehicles includes utilizing one or more autonomous vehicles (AVs) and selectively altering a dynamic state of the one or more AVs with one or more actuators. The method further includes capturing vehicle state information and information about an environment surrounding the one or more AVs with one or more sensors, the one or more sensors disposed on at least one of the one or more AVs. The method further includes executing programmatic control logic stored in memory of one or more control modules, at least one of the one or more AVs having the one or more sensors also being equipped with at least one of the one or more control modules, each of the one or more control modules also having a processor, and one or more input/output (I/O) ports, the processor executing the programmatic control logic, and the I/O ports in communication with the one or more sensors and the one or more actuators. The programmatic control logic receives vehicle state information from the one or more sensors, including: receiving a basic safety message (BSM) from the one or more other vehicles. The BSM includes vehicle size, vehicle type, vehicle speed, vehicle acceleration, vehicle location, vehicle heading, and vehicle turn signal status. The programmatic control logic further includes control logic that acquires trajectory-related data for each of the one or more other vehicles and a host AV approaching an intersection by combining the vehicle state information and information about an environment surrounding the host AV, and BSMs from the one or more other vehicles. The programmatic control logic further includes control logic that predicts a trajectory of a host AV approaching the intersection on a road, and for predicting a trajectory of one or more other vehicles approaching, at, or within the intersection by extrapolating a trajectory of each of the one or more vehicles, and of the host AV from the trajectory-related data. The programmatic control logic further includes control logic that determines multi-directional conflicts identification per driving direction (MDCIPD) messages, including predicting one or more conflicts between the host AV and the other vehicles, given a current driving direction and vehicle state information for the host AV, and for each of the other vehicles, and the MDCIPD messages, and the vehicle state information to a cloud computing device. The programmatic control logic further includes control logic that determines waiting relations for deadlock prevention from the MDCIPD messages and vehicle state information based on driving directions, position and timing for each of the host AV and the other vehicles approaching, entering, or within the intersection, as well as topology, laws, signage, and rules of the intersection. The waiting relations define a right-of-way calculation for each of the host AV and the other vehicles. The right-of-way calculation utilizes driving directions, positions, and timing of each of the host AV and the other vehicles approaching, entering, or within the intersection, the topology and rules of the intersection, local laws, and signage present at or proximate to the intersection. The programmatic control logic further includes control logic that generates one or more of a deadlock precaution notification (DPN) and a deadlock prevention coordination instruction (DPCI). The DPN is generated from the MDCIPD messages and includes information directly indicative of whether there is a potential for deadlock from the. The DPCI includes information directly indicative of control actions necessary for each of the host AV and any other AVs approaching, within, or entering the intersection to avoid deadlock at the intersection. The programmatic control logic further includes control logic that transmits, from the cloud computing device, and receives, by the host AV and the one or more AVs, one or more of the DPN and the DPCI. The programmatic control logic further includes control logic that performs one or more advanced driver assistance system (ADAS) functions via the one or more actuators in response to receiving one or more of the DPN and DPCI, and causes the one or more AVs to avoid deadlock at the intersection.

In still another aspect of the present disclosure generating the DPCI further includes selectively generating the DPCI upon determining that two or more AVs capable of sending the MDCIPD messages are at, within, or entering the intersection. Upon determining that there is no potential for deadlock at the intersection, the method causes the host AV to rely solely upon the guidance systems and ADAS functions of the host AV to traverse the intersection. Upon determining that there is a potential for deadlock at the intersection based on a presence of at least one other vehicle at the intersection, the method causes the host AV to rely solely upon the host AV's guidance systems and ADAS functions to avoid deadlock at the intersection. Upon determining that there is a potential for deadlock at the intersection based on a presence of at least one other AV at the intersection, the method causes the host AV and the at least one other AV to coordinate guidance systems and ADAS functions to collectively avoid and prevent deadlock at the intersection.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
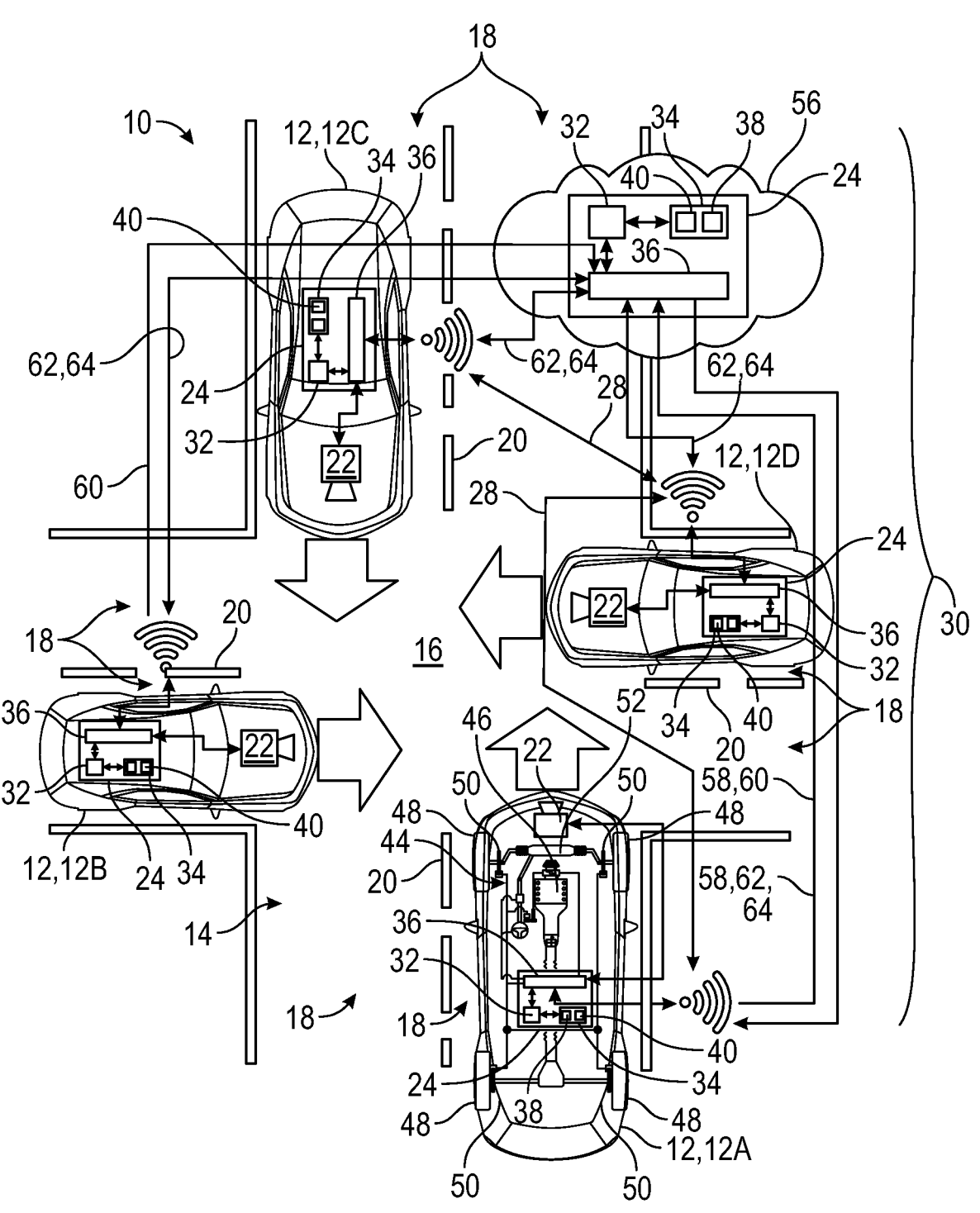
FIG. 1 is an environmental view of a system for deadlock precaution and prevention for autonomous vehicles according to an aspect of the present disclosure.

Referring to FIG. 1 a system 10 for deadlock precaution and prevention for vehicles 12 is shown. More specifically, vehicles 12 shown include one or more autonomously driven vehicles (AVs) 12A-12D. However, it should be appreciated that while at least one of the vehicles 12A-12D is an AV, any one or several of the vehicles 12 shown may be AVs without departing from the scope or intent of the present disclosure. The AVs 12A-12D may be any of a wide variety of vehicles 12 without departing from the scope or intent of the present disclosure. In some examples, AVs 12A-12D may be cars, trucks, sport-utility vehicles (SUVs), buses, semi-tractors, tractors used in farming or construction or the like, watercraft, aircraft such as planes or helicopters, or the like. The AVs 12A-12D are shown traveling on a road 14 at an intersection 16. The road has a plurality of lanes 18 defined by lane markings 20. The AVs 12A-12D may travel along any type of road 14 having any type of road 14 surface, including any type of pavement, gravel, dirt, ice, or other types of surfaces.

The system 10 generally includes one or more sensors 22 in communication with one or more control modules 24. While only a single sensor 22 is shown on each of the AVs 12A-12D, it should be appreciated that the sensor 22 shown is intended to represent any of a variety of sensors 22 which may be linked to and communicate on a communications network 26 including one or more of a vehicle-to-vehicle (V2V) communications network 28 and a vehicle-to-infrastructure (V2I) communications network 30. For the sake of brevity, the term "infrastructure" is used to collectively refer to the network entities capable of ad hoc wireless communications in the direct link or side link, and the cellular communication network owned by the service providers, hence vehicle-to-network (V2N) communication is also included in the scope of V2I.

The sensors 22 may capture AV 12 position information, electromagnetic and/or optical information in a variety of different wavelengths including those visible to humans as well as infrared, ultraviolet, and other such portions of the light spectrum that are not visible by humans. That is, the sensors 22 may be Global Positioning System (GPS) sensors, cameras, Light Detection and Ranging (LIDAR) sensors, Radio Detection and Ranging (RADAR) sensors, Sound Navigation and Ranging (SONAR) sensors, ultrasonic sensors, inertial measurement units (IMUs), wheel speed sensors, or any of a wide variety of other sensors 22 that can be used to determine the AVs' 12 dynamic state and position relative to the environment without departing from the scope or intent of the present disclosure. The sensors 22 may be integrated with the AVs 12A-12D by the AV 12 manufacturer, or the sensors 22 may be fitted in an after-sales service performed by the AV 12 manufacturer or sensor manufacturer, by a customer, or by other third parties without departing from the scope or intent of the present disclosure. In some examples, the sensor 22 or sensors 22 may be part of a stand-alone sensor 22 system without departing from the scope or intent of the present disclosure.

The control modules 24 are non-generalized electronic control devices having a preprogrammed digital computer or processor 32, non-transitory computer readable medium or memory 34 used to store data such as control logic, software applications, instructions, computer code, data, lookup tables, etc., and one or more input/output (I/O) ports 36. Computer readable medium or memory 34 includes any type of medium capable of being accessed by a computer, such as read-only memory (ROM), random access memory (RAM), a hard disk drive, a compact disc (CD), a digital video disc (DVD), solid-state memory, or any other type of memory. A "non-transitory" computer readable medium or memory 34 excludes wireless, optical, or other communication links that transport electrical or other signals. A non-transitory computer readable medium or memory 34 includes media where data can be permanently stored and media where data can be stored and later overwritten, such as any type of program code, including source code, object code, and executable code. The processor 32 is configured to execute the code or instructions. In some examples, the control module 24 may be a dedicated wireless or Wi-Fi controller. The I/O ports 36 are configured to communicate through wired or wireless means such as the communications network 26 including the V2V communications network 28 and/or the V2I communications network 30 using Wi-Fi protocols under IEEE 802.11x, Bluetooth communications protocols, radio frequency (RF) protocols, or the like.

In several aspects, the control modules 24 include one or more applications 38. An application 38 is a software program configured to perform specific functions or sets of functions. The application 38 may include one or more computer programs, software components, sets of instructions, procedures, functions, objects, classes, instances, related data, or a portion thereof adapted for implementation in a suitable computer readable program code. The applications 38 may be stored within the memory 34 or in an additional or separate memory 34. Examples of the applications 38 include audio or video streaming services, audio or visual processing services, a deadlock precaution and prevention application (DPA) 40, and the like.

In several aspects, the DPA 40 selectively utilizes an advanced driver assistance system (ADAS) 42 to alter AV 12 dynamics through actuators of the AV's 12 vehicle dynamics system 44. In some examples, the actuators of the vehicle dynamics system 44 may include a powertrain 46 providing motive rotational force to one or more wheels 48 of the AV 12. The powertrain 46 may include an internal combustion engine, a transmission, driveshafts, and the like, and/or one or more electric motors, or other such prime movers without departing from the scope or intent of the present disclosure. Additional vehicle dynamics system 44 actuators include one or more brakes 50 which operate to reduce, limit, or completely stop rotation of the wheels 48 and/or of the powertrain 46 directly. The vehicle dynamics system 44 actuators may also include a steering system 52 that can modify the angular orientation of one or more of the wheels 48 of the AV 12 relative a longitudinal axis 54 of the AV 12. By alteration of the angular orientation of the one or more wheels 48 a direction of travel of the AV 12 may be changed.

One or more of the vehicles 12A-12D is a connected autonomous vehicle (CAV) in communication with at least one of the other vehicles 12A-12D and/or infrastructure such as traffic signals, cloud computing devices 56, or the like via V2V and/or V2I communications networks 28, 30. As vehicles 12 in the example shown in FIG. 1 approach the intersection 16, they may encounter one another as shown. In human-operated vehicles, vehicle operators determine when and how to pass through intersections 16 based on laws, signage, the position and timing of each vehicle 12 approaching, entering, or within the intersection 16. By contrast, in AVs 12A-12D, the ADAS 42 utilizes data from the sensors 22 and data communicated over the V2V and/or V2I communications networks 28, 30 to determine when and how each vehicle 12 will proceed through the intersection 16. The ADAS 42 may encounter difficulties in determining when and how each vehicle 12 will proceed under some situations such as when multiple vehicles 12 approach or arrive at the intersection 16 at substantially the same time. Accordingly, the system 10 of the present disclosure utilizes the data communicated over the V2V and/or V2I communications networks 28, 30 within the DPA 40 to avoid situations in which gridlock, crashes, or other such traffic flow impediments may be caused by deadlock within one or more AVs 12A-12D present at the intersection 16. The data communicated over the V2V and/or V2I communications networks 28, 30 may include basic safety messages (BSMs) 58, multi-directional conflicts identification per driving direction (MDCIPD) messages 60, deadlock precaution notifications (DPNs) 62, and/or deadlock prevention coordination instructions (DPCIs) 64, each of which will be described in further detail below.

Deadlock is a situation in which no member of a group can proceed because each member of the group waits for another member to act before taking action. Deadlocks are common in multiprocessing systems, parallel computing and distributed systems because in these contexts systems such as ADAS use software and/or hardware locks to arbitrate shared resources and implement process synchronization.

Figure 2:
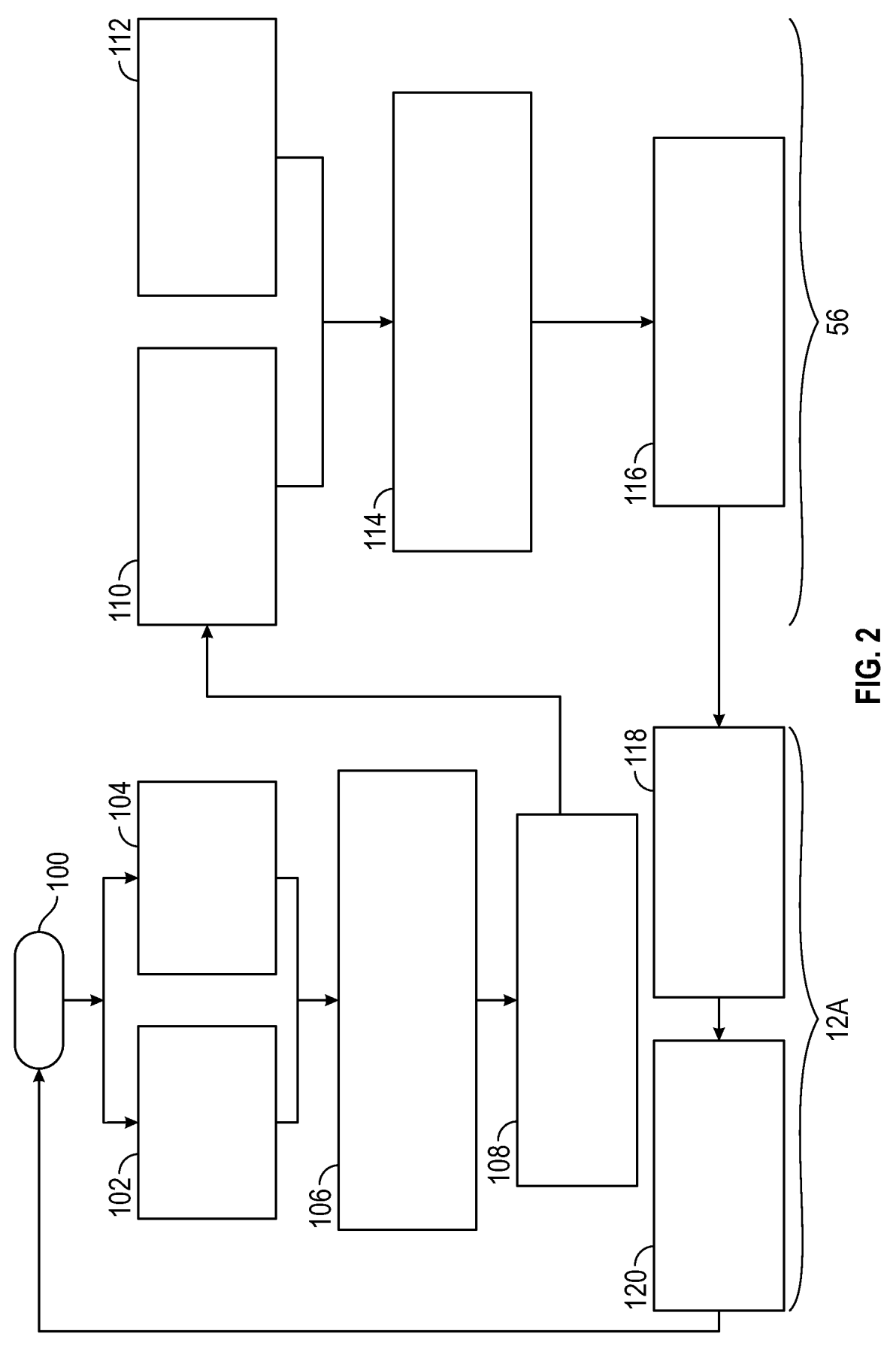
FIG. 2 is a flowchart depicting a method for deadlock precaution and prevention for autonomous vehicles of FIG. 1 according to an aspect of the present disclosure.

Referring now to FIG. 2 and with continuing reference to FIG. 1, the DPA 40 is shown in further detail in flowchart form. More specifically, FIG. 2 depicts a method of deadlock precaution and prevention that utilizes programmatic control logic of the DPA 40. In several aspects, the DPA 40 contains a plurality of subroutines or programmatic control logic portions that enable the AVs 12A-12D to avoid deadlock situations. For scenarios such as those depicted in FIG. 1, the DPA 40 may be heuristically checked to verify that certain steps can effectively serve the intended objectives with simple representations of various communications sent on the communications network 26. As the AVs 12A-12D approach the intersection 16, one or more of the AVs 12A-12D engages the DPA 40 to avoid deadlock.

In a non-limiting example, the method for DPA 40 begins at block 100 for a host AV 12A approaching the intersection 16. As the host AV 12A is about to enter the intersection 16, blocks 102 and 104 are performed to identify whether the host AV 12A can expect multi-directional conflicts with other vehicles 12 at the intersection 16. More specifically, at block 102, the host AV 12A communicates with the other AVs 12B-12D approaching or in the intersection 16 through the V2V communications network 28 and obtains BSM 58 information from each of the other AVs 12B-12D communicating on the V2V communications network 28. The BSM 58 may include a variety of different types of data, but should be appreciated to be a standardized communications packet that is sent on a regular, periodic basis. In several aspects, the BSMs 58 may be standardized by the Society of Automotive Engineers International, or another technical organization. In some examples, the regular periodic basis may be every tenth of a second. The BSM 58 contains data about the communicating vehicle's 12 state, such as vehicle size and type, speed, acceleration, location, heading, turn signal status, and the like.

At block 104, the host AV 12A obtains sensor data from each of the sensors 22 onboard the host AV 12A. The sensor data may include, but is not limited to data from a GPS sensor, optical and/or electromagnetic information from cameras, LiDAR, SONAR, ultrasonic sensors IMUs, wheel speed sensors, and the like. Each of the other vehicles 12B-12D approaching the intersection 16 may present a potential collision risk for the host AV 12A.

Accordingly, at block 106, the sensor data and the BSM 58 data is taken as input to a programmatic control logic portion that predicts a trajectory of the other vehicles 12B-12D approaching the intersection 16. That is, based on BSMs 58 from the other vehicles 12B-12D and the data from the onboard sensors 22 of the host AV 12A, the DPA 40 determines a probability that the host AV 12A will approach closely to one or more of the other vehicles 12B-12D at the intersection 16 as the other vehicles 12B-12D approach from other directions. It should be appreciated that the precise distance between the host AV 12A and other vehicles 12B-12D at the intersection 16 may vary substantially from intersection 16 to intersection 16, vehicle 12 type and size, and a number of other factors. However, a predetermined threshold safe distance may be used as a metric upon which trajectory-based proximity predictions may be based.

Should the DPA 40 determine that, based on the trajectories of each of the host AV 12A and the other vehicles 12B-12D, that there is a sufficiently high probability that the host AV 12A and other vehicles 12B-12D will come into proximity that is less than the predetermined threshold, then the DPA 40 will proceed to adjust driving functions of the host AV 12A and, if one or more of the other vehicles 12B-12D is also equipped with ADAS 42 functionality and the DPA 40, then the DPA 40 will adjust driving functions of the one or more other vehicles 12B-12D having the DPA 40.

In some examples, as the host AV 12A approaches the intersection, if two or more other vehicles 12B-12D are approaching the intersection 16 and their trajectory-related data indicate a likelihood of entering into proximity less than the predetermined threshold, then the host AV 12A can be said to expect multi-directional conflicts. That is, the host AV 12A expects conflicts with other vehicles 12B-12D coming from two or more directions. In some examples, the other vehicles 12B-12D may be classed as potentially impacting vehicles, indicating that the other vehicles 12B-12D are already in or imminent to enter the intersection 16 from driving directions other than the direction of travel of the host AV 12A.

Trajectory-related data for each of the other vehicles 12B-12D may include location, speed, driving intention (i.e., driving straight through the intersection 16 or turning left or right at the intersection 16), path history, and any other such information that may be parsed as relevant to the other vehicle 12B-12D trajectory. These data may come from the BSMs 58 and/or host AV 12A onboard perception functions based on the data from the one or more sensors 22. When only one data source (i.e., the BSMs 58 only, or the onboard sensors 22 only) is available, the DPA 40 may assign a lower confidence level to trajectory-related data for each of the other vehicles 12B-12D. By contrast, when both BSMs 58 and onboard sensor 22 perception data is available to the host AV 12A and the DPA 40, then a higher confidence level, greater than the lower confidence level, may be assigned to the trajectory-related data for the other vehicles 12B-12D. The confidence levels described hereinabove may be applied to the types of actions that the host AV 12A may take in response to the trajectory-related data. When high-confidence level data is available, right-of-way calculations and ADAS 42-driven commands to the vehicle dynamics system 44 actuators may be carried out with differing amplitude, speed, or acceleration than when only the lower confidence level data is available.

At block 108, the DPA 40 packages the MDCIPD message 60 including the predicted trajectories of the other vehicles 12B-12D approaching the intersection 16. For the host AV 12A, the MDCIPD message 60 utilizes the predicted trajectories of the other vehicles 12B-12D approaching the intersection 16 and the host AV 12A trajectory to determine whether there is a likely conflict between the host AV 12A and the other vehicles 12B-12D at the intersection 16, given the host AV's 12A current driving direction and state information. Additionally, at block 108, the DPA 40 sends the MDCIPD message 60 to the cloud computing device 56 for further processing. The MDCIPD messages 60 may indicate if the host AV 12A expects multi-directional conflicts, or not, which is sufficient for use in most scenarios such as those depicted generally in FIG. 1. In other examples, the MCDIPD messages 60 may include additional information such as the host AV's 12A destination direction, original directions associated with the identified conflicts, or the like. The additional information may be used in additional programmatic control logic functions of the DPA 40, such as determining waiting relationships at the intersection 16 for all of the vehicles 12A-12D at the intersection 16, right-of-way calculations, deadlock prevention coordination strategy, and the like.

At block 110, the cloud computing device 56 receives the MDCIPD messages 60 from one or more vehicles 12 or AVs 12A-12D approaching the relevant intersection 16. At block 112, predefined driving directions based on topology and rules of the intersection 16 are retrieved from the sensors 22 and from the memories 34 of the host AV's 12A control modules 24, as well as the memories 34 of any other vehicles 12B-12D at the intersection 16 which happen to be AVs with the DPA 40.

The MDCIPD messages 60 and driving direction information from blocks 110 and 112 are subsequently analyzed at block 114 to determine waiting relationships for right-of-way, and a deadlock prevention coordination strategy is developed where possible. That is, programmatic control logic executed at block 114 is performed on the received MDCIPD messages 60 together with the driving directions, topology, and/or rules of the intersection 16 for deriving whether a potential deadlock may occur at the intersection 16. Upon determining that there is a potential for deadlock at the intersection 16, the programmatic control logic of the DPA 40 executed at block 114 derives a deadlock prevention coordination strategy. In an example in which the host AV 12A is the only AV approaching the intersection 16 during a predefined time window, the MDCIPD messages 60 pertaining only to the driving directions for the host AV 12A are received at block 110. Since the host AV 12A is the only vehicle 12 with the DPA 40 in the example, the DPNs 62 to be sent directly indicate that no other vehicle 12 has sent an MDCIPD message 60, and accordingly, no DPCI 64 message should be generated, as no coordination between the host AV 12A and other vehicles 12B-12D can be accomplished.

However, in examples where one or more of the other vehicles 12B-12D at the intersection 16 are AVs 12 utilizing the DPA 40, then the MDCIPD messages 60 pertaining to the two or more original directions of the two or more AVs 12 at the intersection 16 are received, and DPNs 62 to be sent directly indicate and include information about multi-directional conflicts that may be expected based on all available original vehicle 12 directions. Based on a priority ranking of involved AVs 12A-12D at the intersection 16, together with a waiting loop for right-of-way calculations and timing, the deadlock prevention coordination strategy following a potential deadlock is determined.

At block 116 results from the analysis carried out at block 114 are encapsulated into DPNs 62 and DPCIs 64 (when two or more AVs with the DPA 40 are at the intersection 16), and sent to the relevant AVs at the intersection 16. The DPA 40 then proceeds to block 118.

At block 118, the host AV 12A receives the DPNs 62 and DPCIs 64 (when available) from the cloud computing device 56. At block 120, the host AV 12A acts according to the received DPNs 62 and DPCIs 64 (when available). When the received DPNs 62 indicate that no other AV is present at the intersection 16 and no other AV has sent an MDCIPD message 60, then the host AV 12A relies upon itself for deadlock avoidance. That is, the host AV 12A will act without instruction from the cloud computing device 56. In other examples, the host AV 12A may act by assuming that there is no potential deadlock or adjust its own path and/or motion planning based on received DPCIs 64 for deadlock prevention.

In several aspects, blocks 102-108, 118 and 120 are carried out locally on host AVs 12A utilizing the DPA 40, while blocks 110-116 are carried out in and on cloud computing devices 56 in communication with AVs utilizing the DPA 40. Further, it should be appreciated that the DPA 40 may be executed continuously, periodically, or upon the occurrence of a particular inciting factor. In several aspects, the host AV 12A may execute the DPA 40 upon arriving in proximity to any and all intersections 16, only certain predefined intersections 16, or the like without departing from the scope or intent of the present disclosure.

Figure 3:
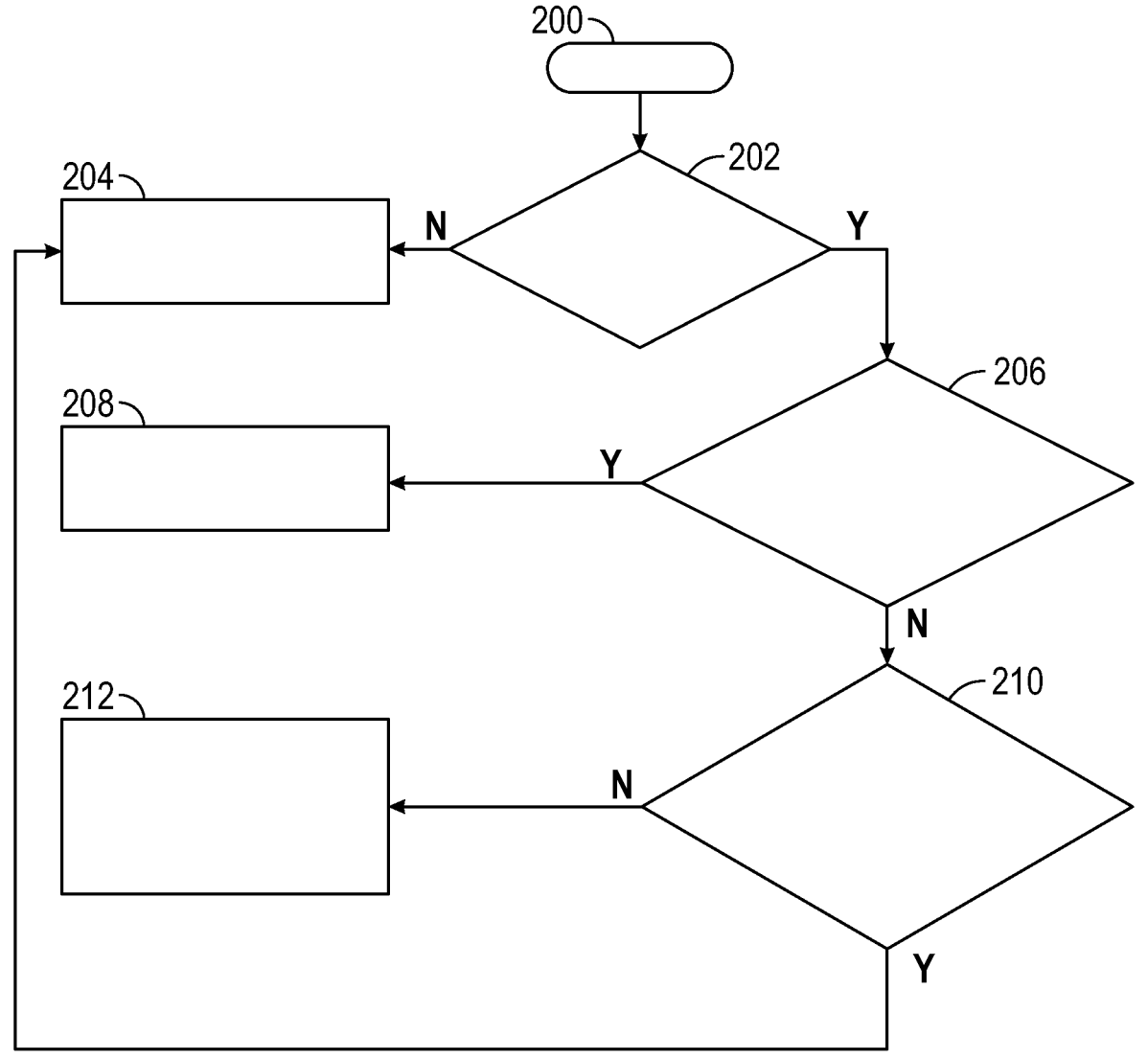
FIG. 3 is a flowchart depicting a series of exemplary decisions taken by an exemplary vehicle approaching an intersection and utilizing the system and method of deadlock precaution and prevention for autonomous vehicles of FIGS. 1 and 2 according to an aspect of the present disclosure.

Referring now to FIG. 3 and with continuing reference to FIGS. 1 and 2, an example of simplified condition branches corresponding to simple MDCIPD message 60 and DPN 62 representations is shown in flowchart form. The example begins at block 200. At block 202, the host AV 12A determines whether a multi-directional conflict or conflicts is likely. When the host AV 12A expects no multi-directional conflicts (e.g., when it is the only vehicle 12 present) at the intersection 16, no deadlock is possible, and the example proceeds to block 204 where the host AV 12A proceeds through the intersection 16 assuming that there is no potential deadlock. By contrast, when at block 202, the host AV 12A determines that there is a possibility for a multi-directional conflict with more than one vehicle 12 approaching the intersection 16, then at block 206, the DPA 40 assesses whether, from the DPNs 62 any other AVs are present at the intersection 16 and have sent an MDCIPD message 60. When no other AVs have sent an MDCIPD message 60, then the example proceeds to block 208, and the host AV 12A relies solely upon its own guidance systems, DPA 40, and ADAS 42 to proceed through the intersection 16 and perform deadlock avoidance. By contrast, when the DPNs 62 received indicate that another AV is present at the intersection 16 and has sent an MDCIPD message 60, then the example proceeds to block 210. At block 210 when the DPNs 62 received by the host AV 12A indicate that none of the other AVs with the DPA 40 expects no multi-directional conflict, then the at block 212, the host AV 12A adjusts its path and motion planning based on received DPCIs 64 in order to avoid and prevent deadlock at the intersection 16. It should be appreciated that when other AVs are present at the intersection 16 and utilizing the DPA 40, each of the AVs at the intersection 16 will adjust path and motion planning based on the received DPCIs 64 to avoid and prevent deadlock. By contrast, when at block 210, when the DPNs 62 received by the host AV 12A indicate that another AV with the DPA 40 expects no multi-directional conflicts, then the host AV 12A assumes there is no potential for deadlock and proceeds on its own recognizance at block 204 as described previously.

A system 10 and method for deadlock precaution and prevention for autonomous vehicles 12 of the present disclosure offers several advantages. These include the ability to operate to allow host AVs 12A to mitigate the risk of deadlock at an intersection 16 dominated by autonomous vehicles, with the effectively achievable prevention of deadlock with the presence of two or more V2V and V2I-enabled AVs, or at least precaution notification about potential deadlock with the presence of only a single V2V and V2I-enabled AV. The system 10 and method 100 of the present disclosure is resource-efficient, based on the introduction of a few vehicle-to-everything (V2X) messages such as BSMs 58, MDCIPD messages 60, DPNs 62 and DPCIs 64, which are either currently standardized or do not require standardization, and a cloud computing device 56 that performs light-weight calculations, thus improving ADAS functionality, redundancy, and speed without increasing complexity, and while maintaining or improving vehicle operator comfort.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for deadlock precaution and prevention in autonomous vehicles, the system comprising:

one or more autonomous vehicles (AVs);

one or more actuators, the one or more actuators selectively altering a dynamic state of the one or more AVs;

one or more sensors, the one or more sensors disposed on at least one of the one or more AVs and capturing vehicle state information and information about an environment surrounding the one or more AVs;

one or more control modules, the at least one of the one or more AVs having the one or more sensors also being equipped with at least one of the one or more control modules, each of the one or more control modules having a memory, a processor, and one or more input/output (I/O) ports, the memory storing programmatic control logic, the processor executing the programmatic control logic, and the I/O ports in communication with the one or more sensors and the one or more actuators; wherein the programmatic control logic includes:

a first control logic for receiving vehicle state information;

a second control logic for predicting a trajectory of a host AV approaching an intersection on a road, and for predicting a trajectory of one or more other vehicles approaching, at, or within the intersection;

a third control logic for transmitting multi-directional conflicts identification per driving direction (MDCIPD) messages, and the vehicle state information from the host AV and from the one or more other AVs to a cloud computing device;

a fourth control logic for determining, by the cloud computing device, waiting relations for deadlock prevention at the intersection based on the MDCIPD messages and vehicle state information;

a fifth control logic for transmitting, from the cloud computing device, and receiving, by the host AV and one or more other AVs, one or more of a deadlock precaution notification (DPN) and a deadlock prevention coordination instruction (DPCI); and a sixth control logic for performing, by the host AV and the one or more other AVs, one or more advanced driver assistance system (ADAS) functions via the one or more actuators in response to receiving one or more of the DPN and DPCI, and causing the one or more AVs to avoid deadlock at the intersection.

2. The system of claim 1 wherein the first control logic further comprises:

control logic for receiving a basic safety message (BSM) from the one or more other vehicles, wherein the BSM comprises:

vehicle size, vehicle type, vehicle speed, vehicle acceleration, vehicle location, vehicle heading, and vehicle turn signal status.

3. The system of claim 2 wherein the second control logic further comprises:

control logic for acquiring trajectory-related data for each of the one or more other vehicles and the host AV approaching the intersection by combining the vehicle state information and information about an environment surrounding the host AV, and BSMs from the one or more other vehicles; and control logic for extrapolating a trajectory of each of the one or more vehicles, and of the host AV from the trajectory-related data.

4. The system of claim 1 wherein the third control logic further comprises:

control logic for determining the MDCIPD messages, including predicting one or more conflicts between the host AV and the other vehicles, given a current driving direction and vehicle state information for the host AV, and for each of the other vehicles.

5. The system of claim 1 wherein the fourth control logic further comprises:

control logic for determining waiting relations to avoid deadlock based on driving directions, position and timing for each of the host AV and the other vehicles approaching, entering, or within the intersection, as well as topology, laws, signage, and rules of the intersection.

6. The system of claim 5 wherein the waiting relations define a right-of-way calculation for each of the host AV and the other vehicles, and wherein the right-of-way calculation utilizes driving directions, positions, and timing of each of the host AV and the other vehicles approaching, entering, or within the intersection, the topology and rules of the intersection, local laws, and signage present at or proximate to the intersection.

7. The system of claim 1 wherein the fifth control logic further comprises:

control logic for generating the DPN from the MDCIPD messages; and control logic for generating the DPCI;

wherein the DPN includes information directly indicative of whether there is a potential for deadlock; and wherein the DPCI includes information directly indicative of control actions necessary for each of the host AV and any other AVs approaching, within, or entering the intersection to avoid deadlock at the intersection.

8. The system of claim 7 wherein the control logic for generating the DPCI further comprises:

control logic that selectively generates the DPCI upon determining that two or more AVs capable of sending the MDCIPD messages are at, within, or entering the intersection.

9. The system of claim 8 wherein the control logic that selectively generates the DPCI further comprises:

control logic that upon determining that there is no potential for deadlock at the intersection, causes the host AV to rely solely upon guidance systems and ADAS functions of the host AV to traverse the intersection;

control logic that upon determining that there is a potential for deadlock at the intersection based on a presence of at least one other vehicle at the intersection, causes the host AV to rely solely upon the host AV's guidance systems and ADAS functions to avoid deadlock at the intersection; and control logic that upon determining that there is a potential for deadlock at the intersection based on a presence of at least one other AV at the intersection, causes the host AV and the at least one other AV to coordinate guidance systems and ADAS functions to collectively avoid and prevent deadlock at the intersection.

10. A method for deadlock precaution and prevention in autonomous vehicles, the method comprising:

utilizing one or more autonomous vehicles (AVs);

selectively altering a dynamic state of the one or more AVs with one or more actuators;

capturing vehicle state information and information about an environment surrounding the one or more AVs with one or more sensors, the one or more sensors disposed on at least one of the one or more AVs;

executing programmatic control logic stored in memory of one or more control modules, at least one of the one or more AVs having the one or more sensors also being equipped with at least one of the one or more control modules, each of the one or more control modules also having a processor, and one or more input/output (I/O) ports, the processor executing the programmatic control logic, and the I/O ports in communication with the one or more sensors and the one or more actuators; wherein the programmatic control logic includes:

receiving vehicle state information from the one or more sensors;

predicting a trajectory of a host AV approaching an intersection on a road, and for predicting a trajectory of one or more other vehicles approaching, at, or within the intersection;

transmitting multi-directional conflicts identification per driving direction (MDCIPD) messages, and the vehicle state information from the host AV and from the one or more other AVs to a cloud computing device;

determining, by the cloud computing device, waiting relations for deadlock prevention at the intersection based on the MDCIPD messages and vehicle state information;

transmitting, from the cloud computing device, and receiving, by the host AV and one or more other AVs, one or more of a deadlock precaution notification (DPN) and a deadlock prevention coordination instruction (DPCI); and performing one or more advanced driver assistance system (ADAS) functions via the one or more actuators of the host AV and the one or more other AVs in response to receiving one or more of the DPN and DPCI, and causing the one or more AVs to avoid deadlock at the intersection.

11. The method of claim 10 further comprising:

receiving a basic safety message (BSM) from the one or more other vehicles, wherein the BSM comprises:

vehicle size, vehicle type, vehicle speed, vehicle acceleration, vehicle location, vehicle heading, and vehicle turn signal status.

12. The method of claim 11 further comprising:

acquiring trajectory-related data for each of the one or more other vehicles and the host AV approaching the intersection by combining the vehicle state information and information about an environment surrounding the host AV, and BSMs from the one or more other vehicles; and extrapolating a trajectory of each of the one or more vehicles, and of the host AV from the trajectory-related data.

13. The method of claim 10 further comprising:

determining the MDCIPD messages, including predicting one or more conflicts between the host AV and the other vehicles, given a current driving direction and vehicle state information for the host AV, and for each of the other vehicles.

14. The method of claim 10 further comprising:

determining waiting relations to avoid deadlock based on driving directions, position and timing for each of the host AV and the other vehicles approaching, entering, or within the intersection, as well as topology, laws, signage, and rules of the intersection.

15. The method of claim 14 wherein determining waiting relations further comprises:

defining a right-of-way calculation for each of the host AV and the other vehicles, and wherein the right-of-way calculation utilizes driving directions, positions, and timing of each of the host AV and the other vehicles approaching, entering, or within the intersection, the topology and rules of the intersection, local laws, and signage present at or proximate to the intersection.

16. The method of claim 10 further comprising:

generating the DPN from the MDCIPD messages; and generating the DPCI;

wherein the DPN includes information directly indicative of whether there is a potential for deadlock; and wherein the DPCI includes information directly indicative of control actions necessary for each of the host AV and any other AVs approaching, within, or entering the intersection to avoid deadlock at the intersection.

17. The method of claim 16 wherein generating the DPCI further comprises:

selectively generating the DPCI upon determining that two or more AVs capable of sending the MDCIPD messages are at, within, or entering the intersection.

18. The method of claim 17 selectively generating the DPCI further comprises:

upon determining that there is no potential for deadlock at the intersection, causing the host AV to rely solely upon guidance systems and ADAS functions of the host AV to traverse the intersection;

upon determining that there is a potential for deadlock at the intersection based on a presence of at least one other vehicle at the intersection, causing the host AV to rely solely upon the host AV's guidance systems and ADAS functions to avoid deadlock at the intersection; and upon determining that there is a potential for deadlock at the intersection based on a presence of at least one other AV at the intersection, causing the host AV and the at least one other AV to coordinate guidance systems and ADAS functions to collectively avoid and prevent deadlock at the intersection.

19. A method for deadlock precaution and prevention in autonomous vehicles, the method comprising:

utilizing one or more autonomous vehicles (AVs);

selectively altering a dynamic state of the one or more AVs with one or more actuators;

capturing vehicle state information and information about an environment surrounding the one or more AVs with one or more sensors, the one or more sensors disposed on at least one of the one or more AVs;

executing programmatic control logic stored in memory of one or more control modules, at least one of the one or more AVs having the one or more sensors also being equipped with at least one of the one or more control modules, each of the one or more control modules also having a processor, and one or more input/output (I/O) ports, the processor executing the programmatic control logic, and the I/O ports in communication with the one or more sensors and the one or more actuators; wherein the programmatic control logic includes:

receiving vehicle state information from the one or more sensors, including:

receiving a basic safety message (BSM) from the one or more other vehicles, wherein the BSM comprises:

vehicle size, vehicle type, vehicle speed, vehicle acceleration, vehicle location, vehicle heading, and vehicle turn signal status;

acquiring trajectory-related data for each of the one or more other vehicles and a host AV approaching an intersection by combining the vehicle state information and information about an environment surrounding the host AV, and BSMs from the one or more other vehicles;

predicting a trajectory of a host AV approaching the intersection on a road, and for predicting a trajectory of one or more other vehicles approaching, at, or within the intersection by extrapolating a trajectory of each of the one or more vehicles, and of the host AV from the trajectory-related data;

transmitting multi-directional conflicts identification per driving direction (MDCIPD) messages from the host AV and the one or more other vehicles, including predicting one or more conflicts between the host AV and the other vehicles, given a current driving direction and vehicle state information for the host AV, and for each of the other vehicles, and the MDCIPD messages, and the vehicle state information to a cloud computing device;

determining, by the cloud computing device, waiting relations for deadlock prevention from the MDCIPD messages and vehicle state information based on driving directions, position and timing for each of the host AV and the other vehicles approaching, entering, or within the intersection, as well as topology, laws, signage, and rules of the intersection, wherein the waiting relations define a right-of-way calculation for each of the host AV and the other vehicles, and wherein the right-of-way calculation utilizes driving directions, positions, and timing of each of the host AV and the other vehicles approaching, entering, or within the intersection, the topology and rules of the intersection, local laws, and signage present at or proximate to the intersection;

generating, by the cloud computing device, one or more of a deadlock precaution notification (DPN) and a deadlock prevention coordination instruction (DPCI);

wherein the DPN is generated from the MDCIPD messages and includes information directly indicative of whether there is a potential for deadlock;

wherein the DPCI includes information directly indicative of control actions necessary for each of the host AV and any other AVs approaching, within, or entering the intersection to avoid deadlock at the intersection;

transmitting, from the cloud computing device, and receiving, by the host AV and one or more other AVs, one or more of the DPN and the DPCI; and performing, by the host AV and the one or more other vehicles, one or more advanced driver assistance system (ADAS) functions via the one or more actuators in response to receiving one or more of the DPN and DPCI, and causing the one or more AVs to avoid deadlock at the intersection.

20. The method of claim 19 wherein generating the DPCI further comprises:

selectively generating the DPCI upon determining that two or more AVs capable of sending the MDCIPD messages are at, within, or entering the intersection;

upon determining that there is no potential for deadlock at the intersection, causing the host AV to rely solely upon the guidance systems and ADAS functions of the host AV to traverse the intersection;

upon determining that there is a potential for deadlock at the intersection based on a presence of at least one other vehicle at the intersection, causing the host AV to rely solely upon the host AV's guidance systems and ADAS functions to avoid deadlock at the intersection; and upon determining that there is a potential for deadlock at the intersection based on a presence of at least one other AV at the intersection, causing the host AV and the at least one other AV to coordinate guidance systems and ADAS functions to collectively avoid and prevent deadlock at the intersection.

* * * * *